(12) United States Patent
Doi et al.

(10) Patent No.: US 6,724,003 B1
(45) Date of Patent: Apr. 20, 2004

(54) ELECTRON BEAM-IRRADIATING REACTION APPARATUS

(75) Inventors: Yoshitaka Doi, Kanagawa (JP); Masao Nomoto, Kanagawa (JP); Kazuaki Hayashi, Gunma (JP); Masahiro Izutsu, Kanagawa (JP); Yoshiharu Kageyama, Saitama (JP); Kyoichi Okamoto, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/869,973

(22) PCT Filed: Jan. 11, 2000

(86) PCT No.: PCT/JP00/00065

§ 371 (c)(1),
(2), (4) Date: Jul. 10, 2001

(87) PCT Pub. No.: WO00/42620

PCT Pub. Date: Jul. 20, 2000

(30) Foreign Application Priority Data

Jan. 11, 1999 (JP) .............................................. 11/4268

(51) Int. Cl.$^7$ .............................................. H01J 33/04
(52) U.S. Cl. .................................... 250/492.3; 313/420
(58) Field of Search ............................. 250/492.3, 435; 313/420

(56) References Cited

U.S. PATENT DOCUMENTS

| | | | | |
|---|---|---|---|---|
| 2,670,440 A | * | 2/1954 | Gordon et al. | 250/453.11 |
| 3,486,060 A | * | 12/1969 | Swanson | 313/35 |
| 3,562,793 A | * | 2/1971 | McCann et al. | 313/36 |
| 3,867,637 A | * | 2/1975 | Braun et al. | 378/2 |
| 4,461,972 A | * | 7/1984 | Dmitriev et al. | 313/420 |
| 4,631,444 A | * | 12/1986 | Cheever | 313/420 |
| 5,319,211 A | * | 6/1994 | Matthews et al. | 250/492.3 |
| 5,378,898 A | * | 1/1995 | Schonberg et al. | 250/492.3 |
| 5,416,440 A | * | 5/1995 | Lyons et al. | 315/500 |

FOREIGN PATENT DOCUMENTS

| | | |
|---|---|---|
| DE | 34 00 776 | 7/1985 |
| DE | 43 27 081 | 2/1995 |
| JP | 51-96998 | 8/1976 |
| JP | 52-37553 | 3/1977 |
| JP | 52-149596 | 12/1977 |
| JP | 53-75163 | 7/1978 |
| JP | 55-107228 | 7/1980 |
| JP | 63-168899 | 11/1988 |
| JP | 63-168900 | 11/1988 |
| JP | 8-166497 | 6/1996 |
| JP | 8-166498 | 6/1996 |
| JP | 9-133799 | 5/1997 |
| JP | 9-145900 | 6/1997 |
| JP | 9-171098 | 6/1997 |

* cited by examiner

*Primary Examiner*—Juanita Stephens
*Assistant Examiner*—Blaise Mouttet
(74) *Attorney, Agent, or Firm*—Wenderoth, Lind & Ponack L.L.P.

(57) ABSTRACT

The present invention relates to an electron beam-irradiating reaction apparatus for irradiating a desired object to be treated, such as an exhaust gas, with an electron beam. Conventionally, a scanning tube of an electron beam irradiation device and a reaction device-for receiving the electron beam are rigidly connected. Therefore, excessive stress is applied to a connecting portion between the scanning tube and the reaction device and not only leakage of gas from the connecting portion, but also breakage of a metal window foil provided at an end portion of the scanning tube are likely to occur. In the present invention, to solve such problems, a flexible hermetic sealing member 23 is provided between a portion around the end portion of the scanning tube 12 and a peripheral edge 18a of an electron beam receiving window in a side wall of an electron beam reaction device 18.

19 Claims, 14 Drawing Sheets

Fig. 14
(a)
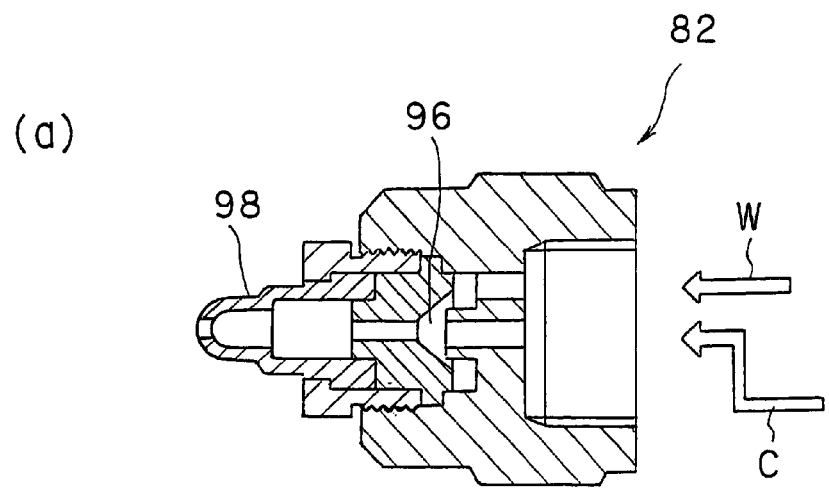
(b)
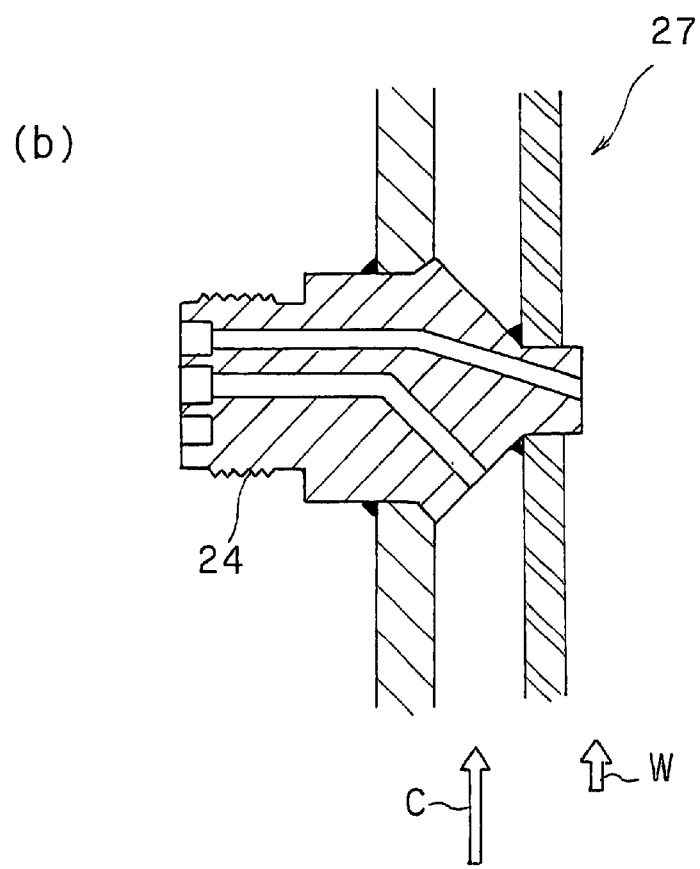

ELECTRON BEAM-IRRADIATING REACTION APPARATUS

TECHNICAL FIELD

The present invention relates to an electron beam-irradiating reaction apparatus for irradiating a desired object with an electron beam and changing properties thereof.

BACKGROUND TECHNIQUES

Generally, in an electron beam-irradiating reaction apparatus, thermoelectrons are generated by using a filament provided at an inner end portion of an accelerating tube which provides an electron accelerator, and an electron beam is formed by accelerating the thermoelectrons in the accelerating tube, followed by irradiation of the electron beam to a desired object through a scanning tube connected to the accelerating tube. An electron beam release window, which is formed at an end portion of the scanning tube from which an electron beam is released, includes a metal window foil attached thereto for shielding the inside of the scanning tube in a vacuum state from the outside. When an electron beam passes through the metal window foil, a part of its energy is converted to thermal energy, to thereby heat the metal window foil. Therefore, a cooling gas is blown against the metal window foil to cool the foil to a temperature such that no deterioration of the foil occurs. The metal window foil, in many cases, is made of titanium or an alloy thereof, and has a thickness of several to several tens $\mu$m. When such a foil is used, its temperature in a cooled condition should be 200 to 400° C.

A typical example of an electron beam-irradiating reaction apparatus is an electron beam gas treatment apparatus in which an electron beam such as that mentioned above is irradiated to a gas such as a combustion gas from a boiler, which contains sulfur oxides or nitrogen oxides, or an exhaust gas discharged from a painting booth, which contains a volatile organic compound, to thereby remove harmful substances such as nitrogen oxides or sulfur oxides contained in the gas. In this gas treatment apparatus, an electron beam irradiation device is set to a position such that an electron beam release window of a scanning tube thereof is in alignment with an electron beam receiving window provided in a side wall of an electron beam reaction device (generally a part of an exhaust gas duct) which allows passage of an exhaust gas therethrough. An electron beam is irradiated through the electron beam release window and the electron beam receiving window to a gas passed through the reaction device.

FIG. 1 shows an example of a conventional electron beam gas treatment apparatus, especially an end portion of a scanning tube 12 and an area in the vicinity thereof (apparatuses similar to that of FIG. 1 are disclosed in FIG. 1 of Unexamined Japanese Patent Application Public Disclosure No. 51-96998, FIG. 2 of Unexamined Japanese Patent Application Public Disclosure No. 52-37553, FIG. 1 of Unexamined Japanese Patent Application Public Disclosure No. 52-149596, FIGS. 1 and 2 of Unexamined Japanese Patent Application Public Disclosure No. 53-75163, FIG. 1 of Unexamined Japanese Utility Model Application Public Disclosure No. 55-107228, FIGS. 1 and 4 of Unexamined Japanese Utility Model Application Public Disclosure No. 63-168899, FIGS. 1 and 7 of Unexamined Japanese Utility Model Application Public Disclosure No. 63-168900 and FIG. 5 of Unexamined Japanese Patent Application Public Disclosure No. 8-166498).

The scanning tube 12 includes an electron beam release window 13 formed at an end portion thereof. A flange 36 is formed along the outer periphery of the end portion of the scanning tube 12. A metal window foil 14 is fixedly held between the flange 36 and a holding plate 16 for maintaining an internal vacuum of the scanning tube 12.

An electron beam reaction apparatus (an exhaust gas duct in the case of treatment of an exhaust gas from a boiler) 18, through which a gas irradiated with an electron beam flows, includes an electron beam receiving window 15 formed in a side wall thereof for receiving an electron beam. A (secondary) metal window foil 34 is provided by means of holding plates 53 and 56 so as to hermetically close the electron beam receiving window.

An electron beam is irradiated into the electron beam reaction device through the metal window foils 14 and 34. As mentioned above, the metal window foils absorb energy of the electron beam and are heated. As a result, it is necessary to cool the metal window foils to a temperature such that no lowering of the strength of the foils occurs. Therefore, in this apparatus, cooling gas nozzle members 51 and 57, which include gas slits (or blow openings) 52 and 58 for blowing a cooling gas against the respective metal window foils, are provided in a space between the metal window foils 14 and 34.

In this case, however, a cooling gas which has been blown against the metal window foils 14 and 34 is diffused into the environment giving rise to the following problems. That is, the cooling gas receives the irradiation of the electron beam when passing through a region where the electron beam passes. When air is used as the cooling gas, ozone and nitrogen oxides (which are harmful to humans and cause corrosion of metallic materials) are produced due to the irradiation of an electron beam. When an inert gas such as nitrogen is used as the cooling gas, although production of ozone and nitrogen oxides in the cooling gas can be prevented, the inert gas after use is subjected to disposal. This is highly disadvantageous in terms of economy.

FIG. 2 shows another example of a conventional electron beam gas treatment apparatus (apparatuses similar to that of FIG. 2 are disclosed in FIGS. 3 and 5 of Unexamined Japanese Patent Application Public Disclosure No. 8-166497 and FIG. 5 of Unexamined Japanese Patent Application Public Disclosure No. 9-171098). The arrangement of the apparatus of FIG. 2 is substantially the same as that of the apparatus of FIG. 1, except that the cooling gas nozzle assembly is changed. The same elements as those shown in FIG. 1 are designated by the same reference numerals, and an explanation thereof is omitted.

In this apparatus, in order to solve the above-mentioned problems, the cooling gas nozzle assembly is formed integrally with a cooling gas nozzle member 61 for the primary metal window foil 14, a cooling gas nozzle member 67 for the secondary metal window foil 34, and exhaust gas tubular passages 65 and 69 disposed so as to face gas slits 62 and 68 of the respective nozzle members. Thus, a cooling gas is supplied and discharged through the tubular passages hermetically sealed from the atmosphere.

With this arrangement, a cooling gas which has passed through the region of passage of the electron beam is not diffused into the atmosphere and can be recovered. Therefore, when air is used as the cooling gas, it is possible to introduce the cooling gas recovered from a discharge opening into a device where the gas is made harmless. Further, it is also possible to use an inert gas such as nitrogen as the cooling gas in a circulative manner.

FIG. 3 shows another example of a conventional electron beam gas treatment apparatus (apparatuses similar to that of FIG. 3 are disclosed in FIG. 4 of Unexamined Japanese Patent Application Public Disclosure No. 52-37553, FIG. 2 of Unexamined Japanese Patent Application Public Disclosure No. 52-149596, FIGS. 3 and 4 of Unexamined Japanese Patent Application Public Disclosure No. 53-21397, FIG. 2 of Unexamined Japanese Patent Application Public Disclosure No. 53-46598, FIGS. 1 and 3 of Unexamined Japanese Utility Model Application Public Disclosure No. 5-30800 and FIG. 2 of Unexamined Japanese Utility Model Application Public Disclosure No. 6-51900).

In the apparatus of FIG. 3, as in the case of FIG. 2, a sealable space is formed between the primary metal window foil 14 and the secondary metal window foil 34. However, in the apparatus of FIG. 3, a single cooling nozzle member 71 and a single exhaust gas tubular passage 73 are disposed adjacent to each other on one side of the sealable space. A cooling gas which has been blown against the primary metal window foil through a slit 72 of the cooling nozzle member 71 is inverted on the other side of the sealable space and returns to the exhaust gas tubular passage 73 for discharge.

However, in the case of the apparatuses of FIGS. 2 and 3, the following problems arise.

An exhaust gas duct as the electron beam reaction device and an electron beam irradiation device are individually set on different base members. The scanning tube 12 of the electron beam irradiation device is rigidly connected to a side wall of the exhaust gas duct through the cooling gas nozzle assembly comprising the cooling nozzle members 61 and 67 or the single cooling nozzle member 71. Therefore, an excessive stress is likely to be applied to a connecting portion between the scanning tube 12 and the side wall of the exhaust gas duct. Consequently, the metal window foil cannot be fixed to the flange at the outer periphery of the end portion of the scanning tube by the holding plate, so that the vacuum in the scanning tube cannot be maintained. In an extreme case, the metal window foil is displaced and forced into the scanning tube, leading to fracture of the foil.

In particular, in a conventional electron beam-irradiating reaction apparatus, it is preferred to omit a secondary metal window foil and use only a primary metal window foil, from the viewpoint of reducing energy loss of an electron beam at the metal window foil, reducing energy required for blowing a cooling gas, and simplifying the structure of the cooling gas nozzle assembly. In such an arrangement, however, when fracture of the primary metal window foil occurs, an exhaust gas enters the scanning tube of an electron beam generator which is required to be maintained in a vacuum condition, and serious contamination or damage is likely to occur. Therefore, it has been considered that it is difficult to realize an electron beam-irradiating reaction apparatus using only a primary metal window foil.

It is an object of the present invention to provide an electron beam-irradiating reaction apparatus which prevents the above-mentioned problems due to rigid connection between the scanning tube of the electron beam irradiation device and the electron beam reaction device in conventional electron beam-irradiating reaction apparatuses and which is free from leakage of a gas to be treated, such as an exhaust gas, and a cooling gas.

SUMMARY OF THE INVENTION

According to the present invention, there is provided an electron beam-irradiating reaction apparatus comprising: an electron beam irradiation device including an electron beam release window at an end portion thereof for releasing an electron beam in a scanning condition, the electron beam release window having a primary metal window foil extended for maintaining an internal vacuum. An electron beam reaction device receives a gas irradiated with an electron beam, the electron beam reaction device having an electron beam receiving window formed in a side wall thereof for receiving the electron beam from the electron beam irradiation device. A cooling gas nozzle assembly includes a blow opening for blowing a cooling gas against the metal window foil, and a flexible cylindrical hermetic sealing member is connected between the end portion of the electron beam irradiation device and a peripheral edge of the electron beam receiving window in window in the side wall of the electron beam reaction device for preventing leakage of the cooling gas between the end portion and the side wall to the outside.

In this apparatus, no rigid connection is made between the electron beam irradiation device and the electron beam reaction device. Therefore, no excessive load is applied to a connecting portion between these devices. Further, this connecting portion is covered by the flexible cylindrical member, so that the cooling gas irradiated with the electron beam is not diffused to the outside.

Specifically, the cooling gas nozzle assembly is provided at the end portion of the electron beam irradiation device, and the flexible cylindrical hermetic sealing member is connected between an outer peripheral portion of the cooling gas nozzle assembly and the peripheral edge portion of the electron beam receiving window in the side wall.

More specifically, the electron beam receiving window is sized so as to be larger than a size which defines a peripheral edge of a scanning path of the electron beam. The cooling gas nozzle assembly as a whole is annularly formed so as to surround the scanning path which allows passage of the electron beam, and the cooling gas nozzle assembly is set at a position such that it substantially occupies the electron beam receiving window.

Preferably, a protective member is provided so as to prevent backscattered electrons, which are generated upon irradiation of an electron beam in the electron beam reaction device, from impinging on the flexible cylindrical hermetic sealing member. Further, the primary metal window foil is sealably fixed at a peripheral edge of the electron beam release window by means of a removable holding plate. The cooling gas nozzle assembly includes a removable portion which is set so as to form a cooling gas blow opening between it and the holding plate, and the metal window foil is capable of being replaced by removing the removable portion and removing the holding plate.

Further, it is preferred that the cooling gas blown against the primary metal window foil have a moisture content equal to or higher than a critical humidity of fine powders in the gas, which are deposited on a surface of the primary metal window foil that contacts the gas. The reason for this is as follows. When an object to be treated by the electron beam-irradiating reaction apparatus is an exhaust gas containing sulfur oxides or nitrogen oxides, fine powders of ammonium sulfate or ammonium nitrate can be formed as a by-product derived from the sulfur oxides or nitrogen oxides, due to irradiation of an electron beam in the reaction device. These powders are likely to be deposited on the metal window foil. Therefore, a cooling gas having a moisture content equal to or higher than the critical humidity is blown against the metal window foil, so that the fine powders deposited on the foil absorb moisture in the cooling gas and are easily peeled off from the metal window foil.

For the same purpose, the cooling gas may contain drops of water. However, when the drops of water in the cooling gas contain a suspendible solid or a water-soluble substance and impinge on the metal window foil which has been heated by irradiation of an electron beam, the suspendible solid or water-soluble substance is dried and solidified due to vaporization of a water component, and can be fixed to the metal window foil. To prevent this problem, it is preferred that the drops of water contained in the cooling gas consist of pure water, which drops are obtained by, for example, spraying pure water into the cooling gas.

Further, in the present invention, an arrangement may be made such that the cooling gas nozzle assembly as a whole is annularly formed so as to surround the scanning path for passage of the electron beam. In addition, the cooling gas nozzle assembly includes a secondary metal window foil provided at an end face thereof on a side of the electron beam reaction device so as to extend across the scanning path, a blow opening for blowing a cooling gas against the primary and secondary metal window foils, and a discharge opening for discharging the blown cooling gas to the outside. In this case, it is possible to have an arrangement such that the cooling gas nozzle assembly includes first and second blow openings for blowing a cooling gas against the primary and secondary metal window foils, respectively, first and second receiving openings for receiving a cooling gas from the outside and supplying the gas to the first and second blow openings, respectively, and first and second discharge openings for discharging the cooling gas blown from the first and second blow openings against the first and second metal window foils, respectively, to the outside.

BRIEF DESCRIPTION OF THE DRAWINGS

FIG. 14 is a disassembled cross-sectional view of a cooling gas nozzle member used in the apparatus of FIG. 13. FIG. 14a shows a two-fluid nozzle and FIG. 14b shows a cooling gas nozzle connected to the two-fluid nozzle.

DETAILED DESCRIPTION OF THE INVENTION

Hereinbelow, with reference to the drawings, description is made of an electron beam-irradiating reaction apparatus of the present invention.

Figure 1:
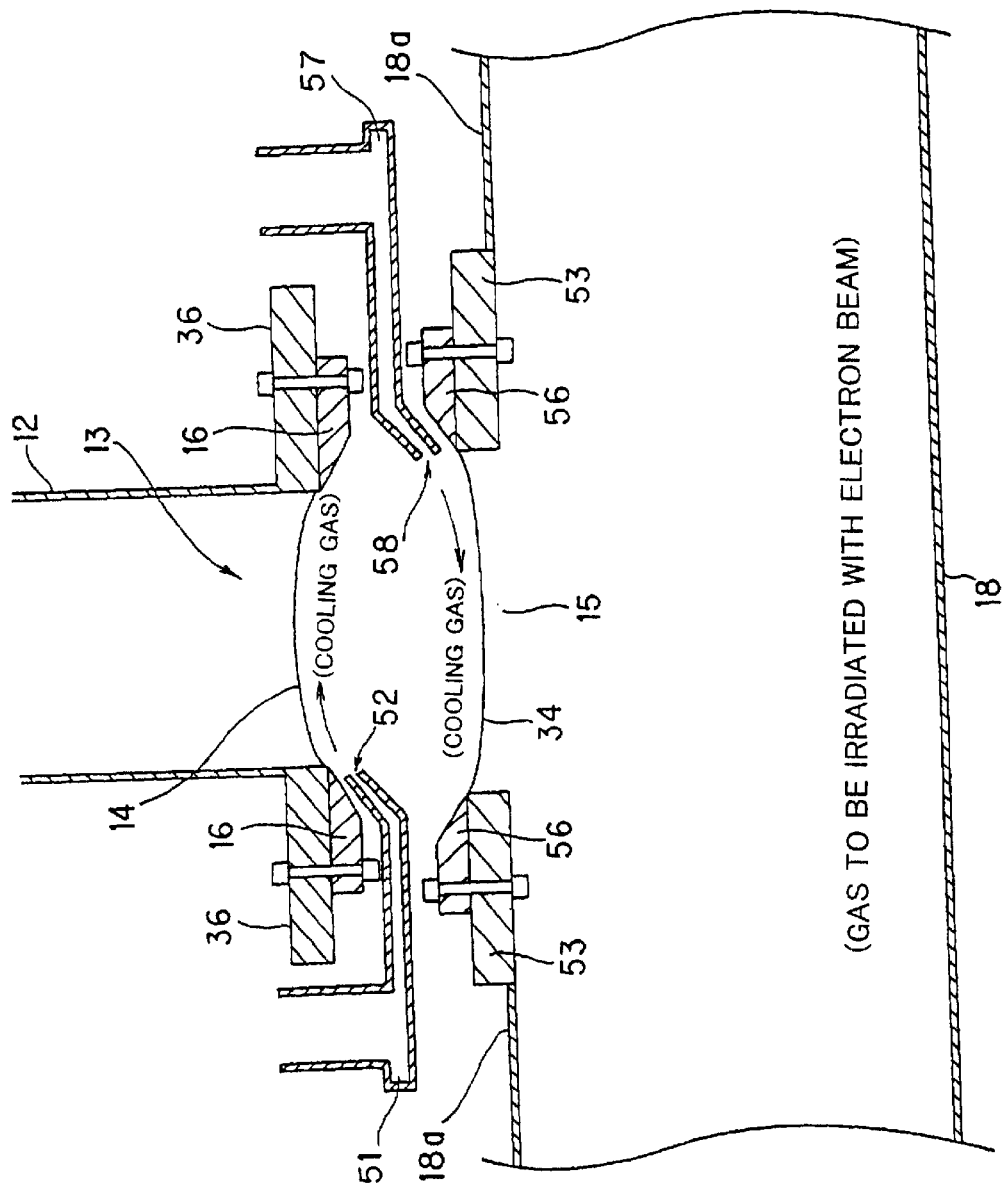
FIG. 1 is a cross-sectional view of a part of a conventional electron beam-irradiating reaction apparatus.
Figure 2:
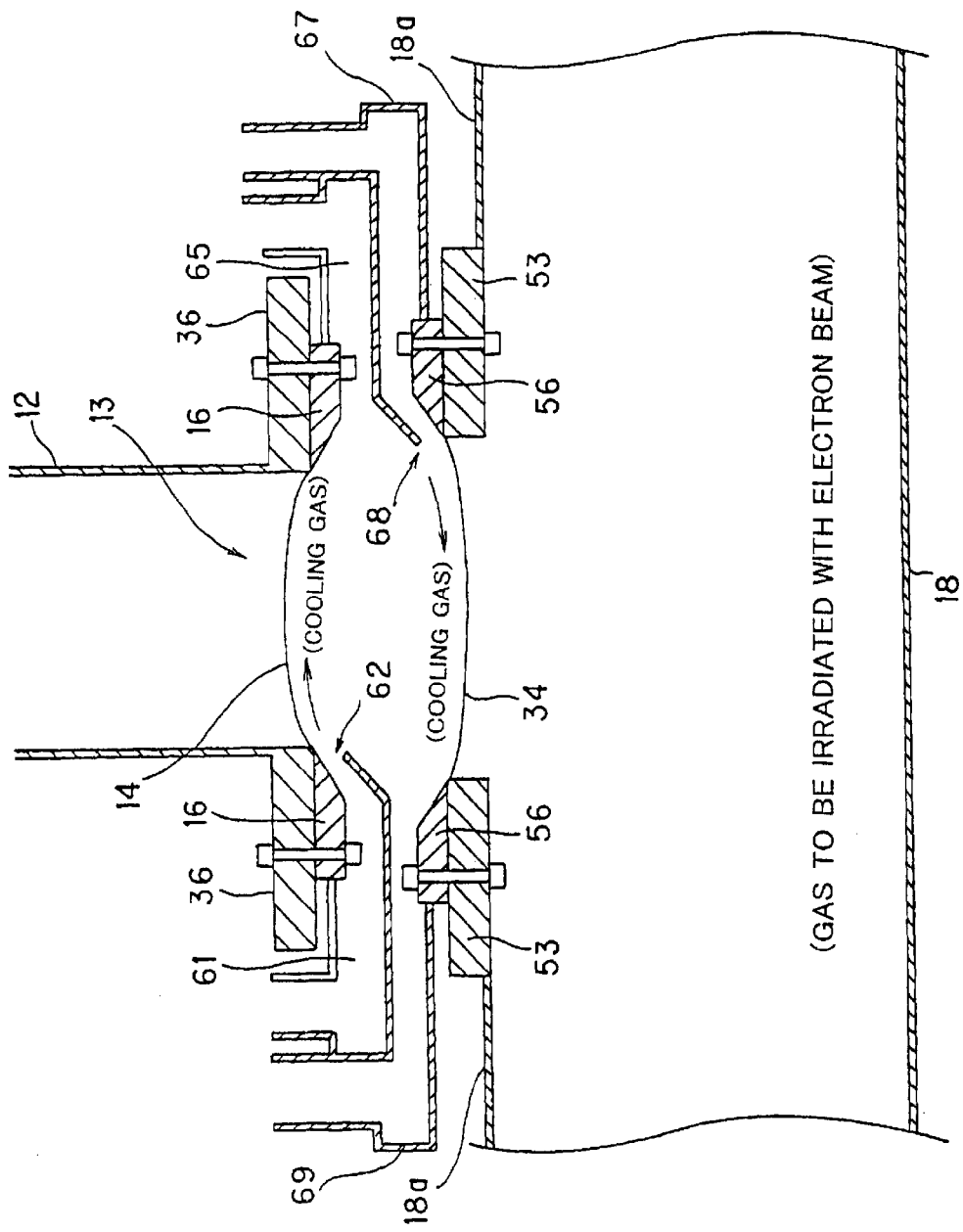
FIG. 2 is a cross-sectional view of a part of another conventional electron beam-irradiating reaction apparatus.
Figure 3:
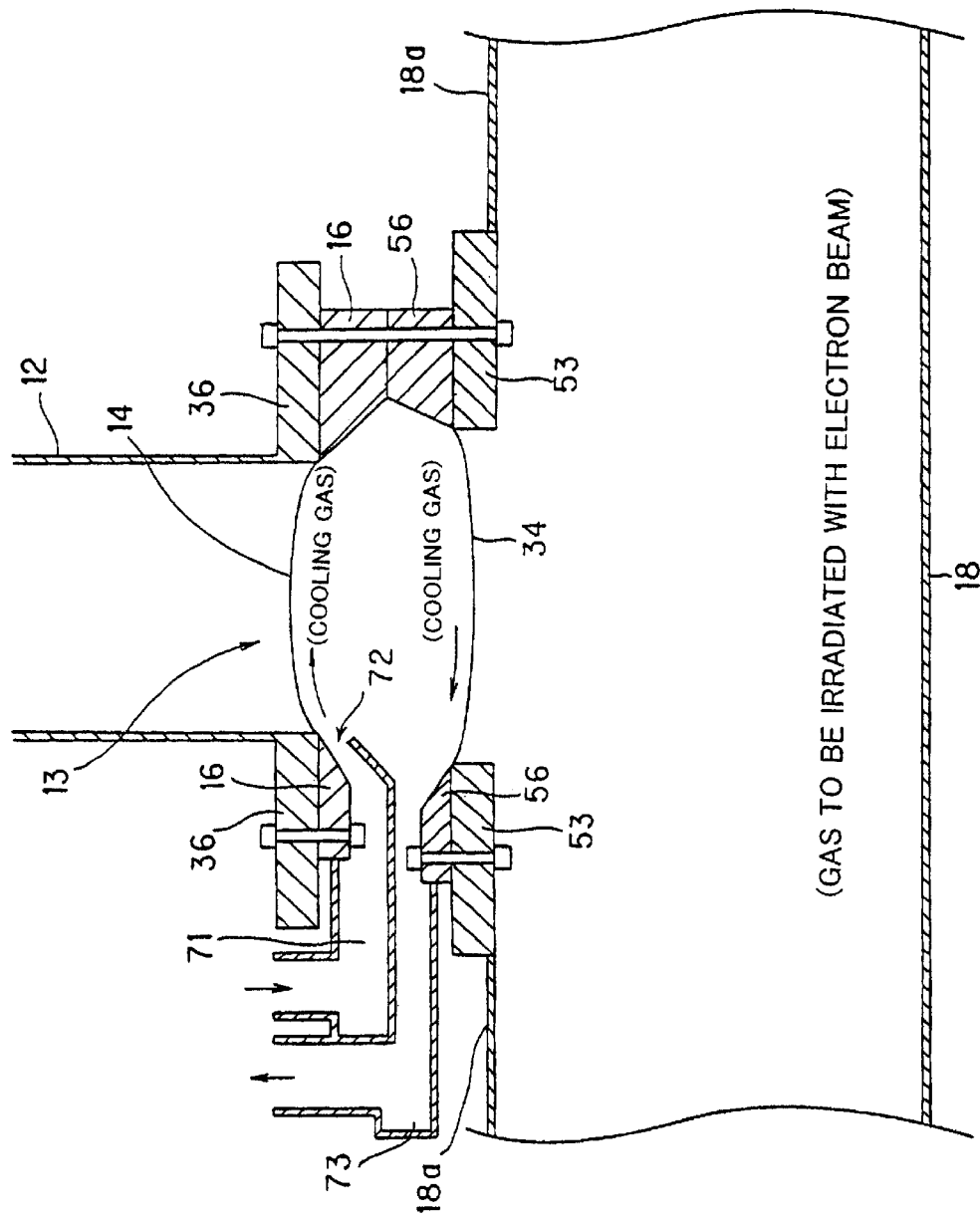
FIG. 3 is a cross-sectional view of a part of a further conventional electron beam-irradiating reaction apparatus.
Figure 4:
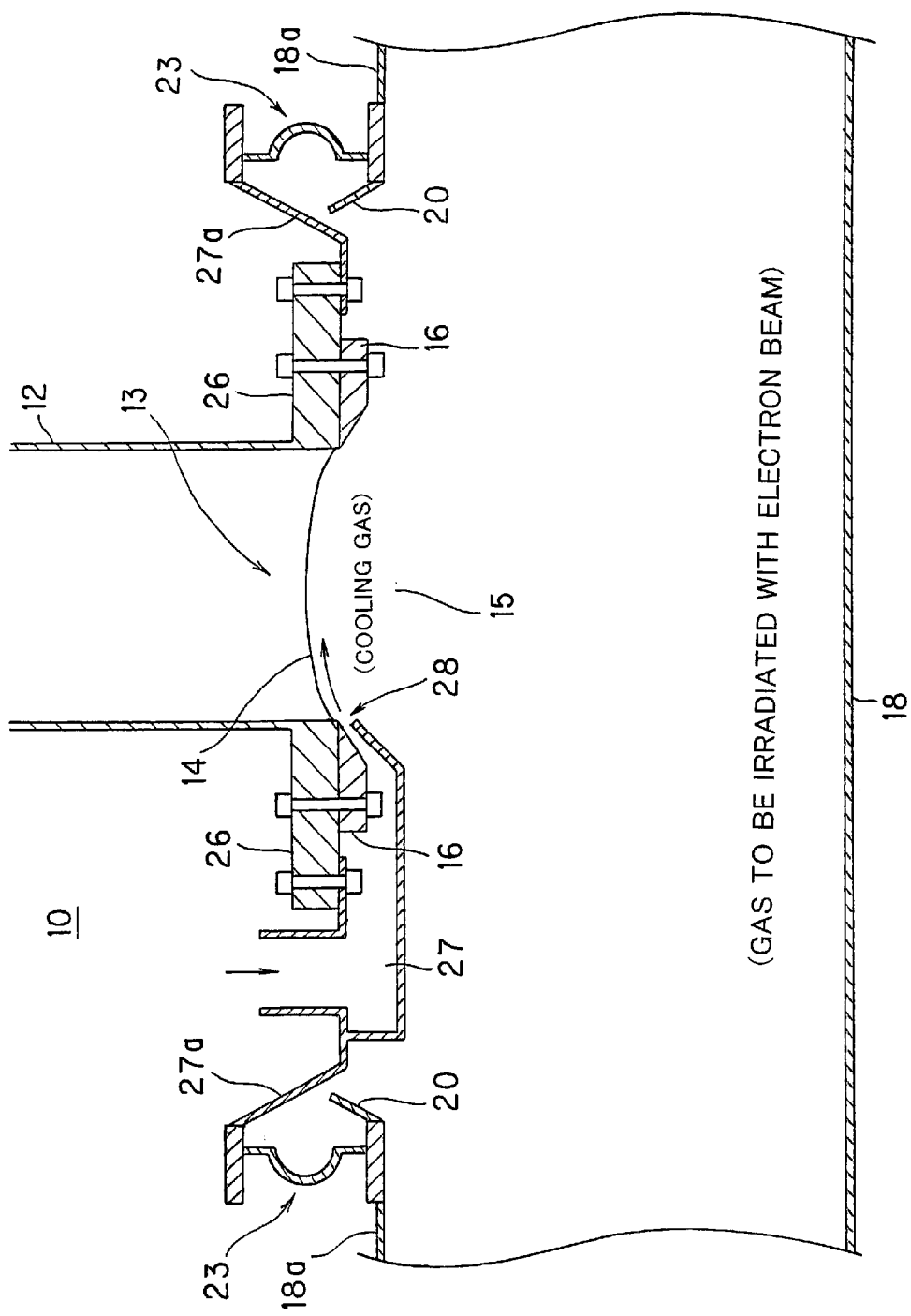
FIG. 4 is a cross-sectional view of a part of an electron beam-irradiating reaction apparatus according to a first embodiment of the present invention.

FIG. 4 shows the scanning tube 12 and a connecting portion between the scanning tube 12 and the electron beam reaction device (or exhaust gas duct) 18 in an electron beam-irradiating reaction apparatus 10 according to a first embodiment of the present invention. As shown in FIG. 4, the electron beam release window 13 at the end portion of the scanning tube 12 is aligned with the electron beam receiving window 15 formed in the side wall of the electron beam reaction device 18. An annular flange 26 is provided along the outer periphery of the end portion of the scanning tube 12. The metal window foil 14 extends over the electron beam release window 13, and a peripheral edge thereof is securely held between the annular flange 26 and the holding plate 16. A cooling gas nozzle assembly 27 is fixed to the annular flange 26 by a bolt, which assembly comprises a cooling gas nozzle member having a gas inlet slit (or blow opening) 28 for directing a cooling gas against the metal window foil 14. The cooling gas nozzle assembly 27 may be fixed by welding or adhesion, instead of using a bolt, as long as it can be fixed in a hermetic condition.

A flexible cylindrical hermetic sealing member 23 is hermetically connected between an outer annular portion 27a of the cooling gas nozzle assembly 27 extending radially outward with respect to a peripheral edge of the annular flange 26 and a peripheral edge 18a of the electron beam receiving window 15 in the side wall of the exhaust gas duct. The flexible cylindrical hermetic sealing member 23 can be formed from an organic material such as cloth or rubber. The flexible cylindrical hermetic sealing member 23 prevents leakage or entry of air or gas from or into the cooling gas nozzle assembly and the exhaust gas duct. In this apparatus, no rigid connection is made between the scanning tube and the exhaust gas duct (i.e., the electron beam reaction device). In other words, as illustrated in FIG. 4, the electron beam irradiation device with the scanning tube 12 and release window 13 is supported independently of the electron beam reaction device 18. Therefore, the connecting portion (e.g., sealing member 23) between the scanning tube and the exhaust gas duct is able to move to conform to positional displacement between the scanning tube and the exhaust gas duct (i.e., relative movement between the electron beam irradiation device and the electron beam reaction device). Consequently, generation of excessive stress at the connecting portion (which occurs in the above-mentioned conventional apparatuses) is prevented, and preventing leakage of gas or air is also prevented.

In this electron beam-irradiating reaction apparatus, as shown in the drawing, the electron beam receiving window 15 formed in the side wall of the electron beam reaction device is made larger than a size which is necessary for defining a path for an electron beam (that is, a passage through which an electron beam is passed for irradiation purposes). The cooling gas nozzle assembly 27 is set in a manner such that it substantially occupies the electron beam receiving window. Further, in this electron beam-irradiating reaction apparatus, a protective cover 20 is provided along the peripheral edge 18a of the electron beam receiving window 15. This prevents a situation in which an electron beam irradiating an exhaust gas in the exhaust gas duct is reflected and scattered, and impinges on the flexible cylindrical hermetic sealing member 23, thereby deteriorating the flexible cylindrical hermetic sealing member 23.

Figure 5:
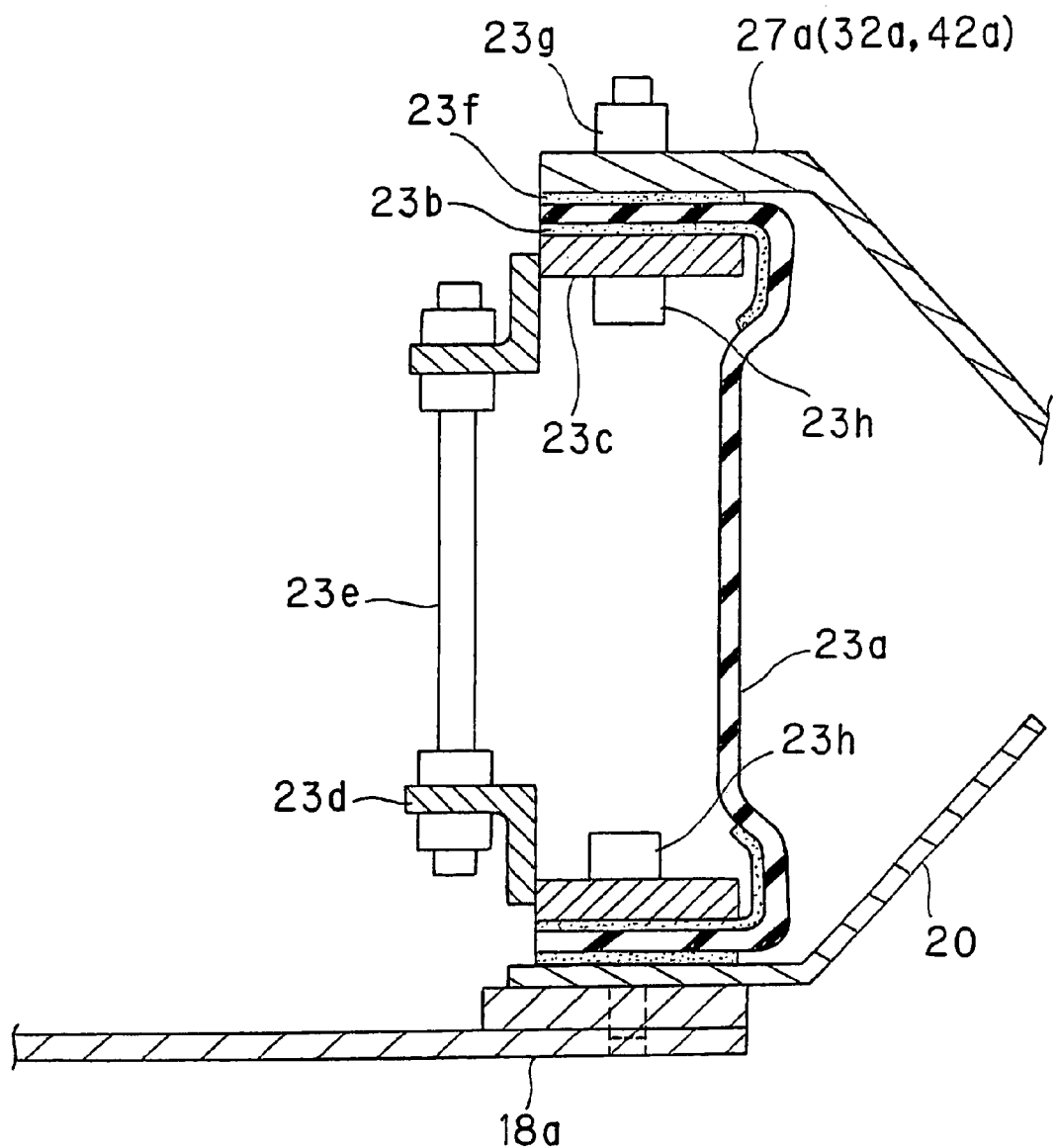
FIG. 5 is a schematic illustration showing an arrangement of a flexible cylindrical hermetic sealing member used in the electron beam-irradiating reaction apparatus of the present invention.

FIG. 5 is a cross-sectional view of a part of an illustrative example of the flexible cylindrical hermetic sealing member 23. In this example, the flexible cylindrical hermetic sealing member comprises a bellows 23a formed from glass fibers coated with ethylene propylene (EPDM) rubber. The flexible cylindrical hermetic sealing member is connected between the outer annular portion 27a of the cooling nozzle assembly and the peripheral edge 18a of the electron beam receiving window. Reference numeral 23c denotes a holding plate; 23b and 23f gaskets; 23g a nut; and 23h a bolt. The protective cover 20 is held between the flexible cylindrical hermetic sealing member 23 and the peripheral edge 18a of the electron beam receiving window. The holding plate 23c is connected to a holder 23d by a bolt/nut assemble 23e extending through the holder 23d, the distance between the scanning tube 12 and the electron beam reaction device 18 is adjusted.

Figure 6:
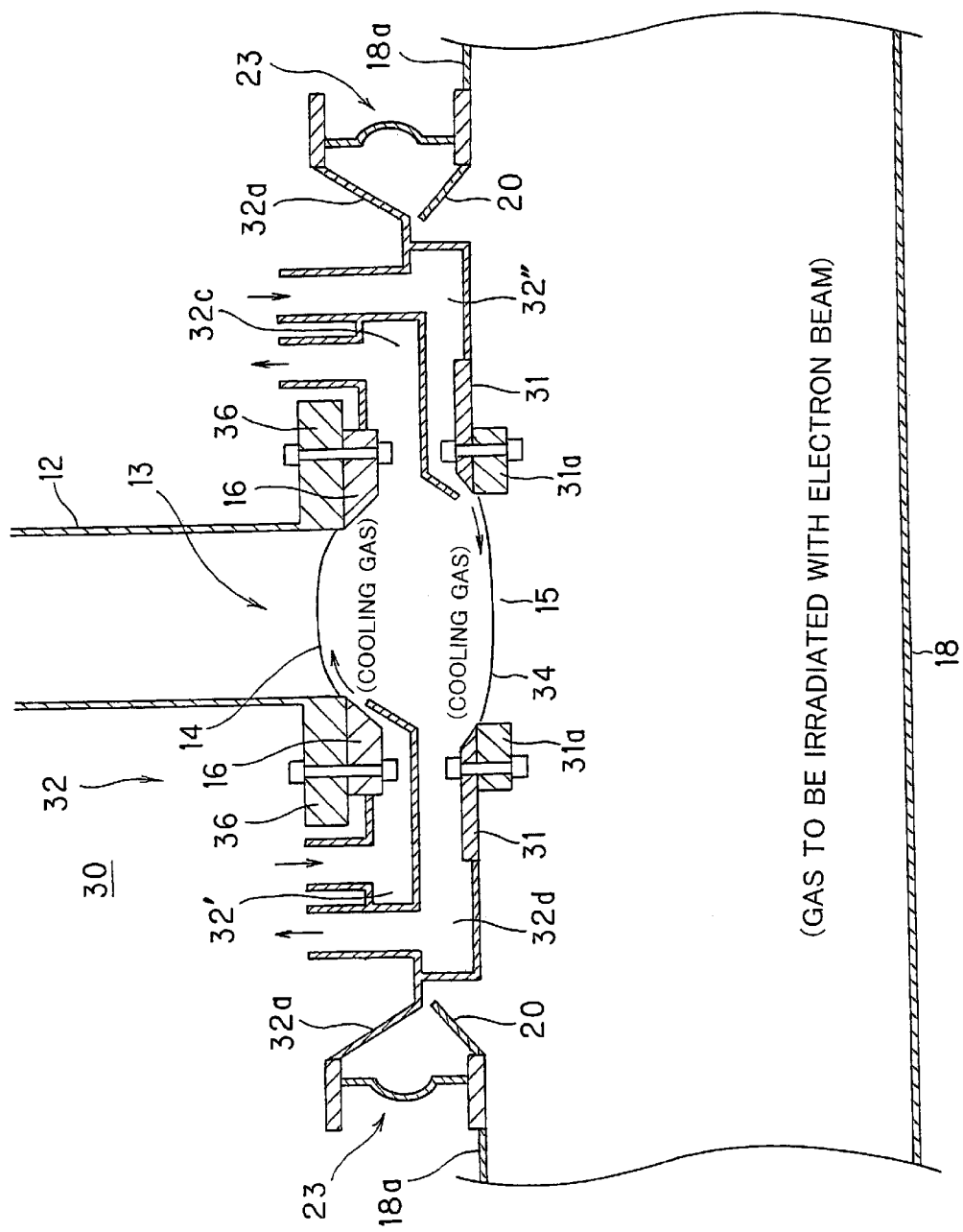
FIG. 6 is a cross-sectional view of a part of an electron beam-irradiating reaction apparatus according to a second embodiment of the present invention.

FIG. 6 is a cross-sectional view of a part of an electron beam-irradiating reaction apparatus 30 according to a second embodiment of the present invention. The same elements as those of the electron beam-irradiating reaction apparatus of FIG. 4 are designated by the same reference numerals as used in FIG. 4, and an explanation thereof is omitted. The apparatus of this embodiment differs from that of FIG. 4 in terms of the cooling gas nozzle assembly (that is, a cooling head and members associated therewith). That is, in the apparatus of FIG. 6, a cooling gas nozzle assembly 32 comprises a second cooling gas nozzle member 32" for cooling a second metal window foil 34 which seals the electron beam receiving window 15, in addition to a first cooling gas nozzle member 32' for cooling the primary (first) metal window foil 14 which seals the electron beam release window 13 of the scanning tube 12. In addition, exhaust gas tubular passages 32c and 32d is provided for discharging a cooling gas supplied from the respective nozzle members. The second metal window foil 34 is securely held between holding plates 31 and 31a and fixed to the cooling gas nozzle assembly. A peripheral edge of the electron beam receiving window 15 is defined by the holding plates 31 and 31a (integral with the cooling gas nozzle assembly). That is, in this electron beam-irradiating reaction apparatus, the scanning tube 12, the primary (first) metal window foil 14, the cooling gas nozzle assembly 32 and the second metal window foil 34 form one integral body.

As in the case of FIG. 4, the flexible cylindrical hermetic sealing member 23 is connected between an outer annular portion 32a of the cooling gas nozzle assembly and the peripheral edge 18a of the electron beam receiving window 15 of the exhaust gas duct. Thus, leakage or entry of the cooling gas or the exhaust gas from or into the connecting portion between the scanning tube and the exhaust gas duct is prevented.

Figure 7:
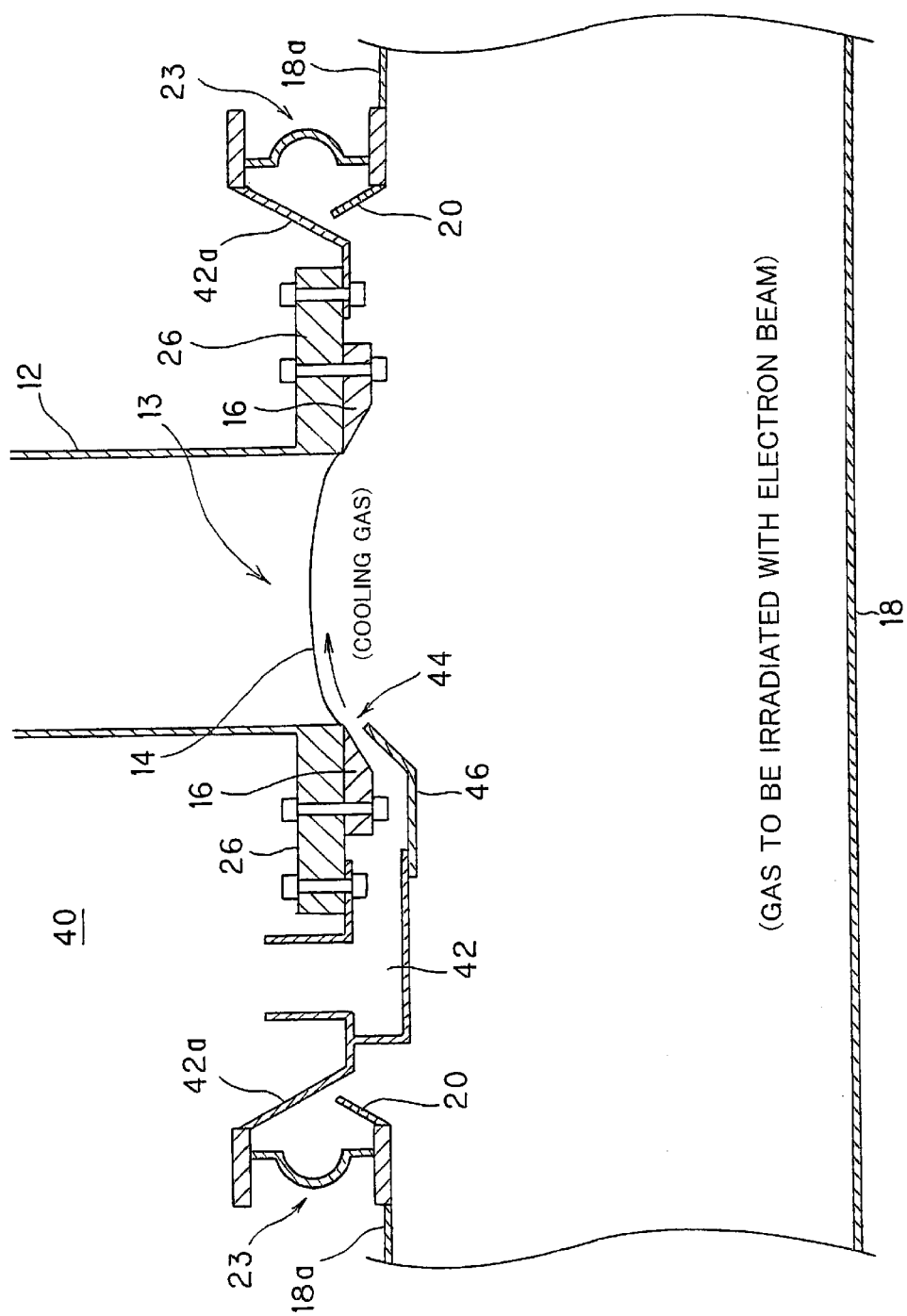
FIG. 7 is a cross-sectional view of a part of an electron beam-irradiating reaction apparatus according to a third embodiment-of the present invention.

FIG. 7 is a cross-sectional view of a part of an electron beam-irradiating reaction apparatus 40 according to a third embodiment of the present invention.

As shown in FIG. 7, the arrangement of the electron beam-irradiating reaction apparatus 40 is basically the same as that of the apparatus of FIG. 4, but differs in that a distal end portion 46 of a cooling gas nozzle member 42, which forms a gas slit 44 between it and the holding plate 16, is removably attached to the remaining portion of the cooling gas nozzle assembly 42. This arrangement allows for easy replacement of the metal window foil. That is, an operation for replacement of the metal window foil 14 comprises the steps of removing the flexible cylindrical hermetic sealing member 23 from the electron beam reaction device 18, moving either the electron beam irradiation device or the electron beam reaction device to thereby secure a working space, removing the distal end portion 46 of the cooling gas nozzle assembly 42, removing the holding plate 16, and replacing the metal window foil 14. Therefore, there is no need to remove the cooling gas nozzle assembly 42 and the scanning tube 12, and replacement can be easily conducted.

In the above-mentioned embodiments, a door (not shown) is provided so that the electron beam receiving window is hermetically covered when the flexible cylindrical hermetic sealing member 23 is removed. Due to this door, it is possible to prevent leakage of the gas contained in the electron beam reaction device 18 when the flexible cylindrical hermetic sealing member 23 is removed from the electron beam reaction device 18.

As mentioned above, the electron beam-irradiating reaction apparatuses such as those shown in FIGS. 4 and 7 using a single metal window foil are superior to the apparatus shown in FIG. 6, in which two metal window foils are used, in terms of an energy efficiency. However, the single metal window foil is brought into direct contact with an exhaust gas to be treated. Therefore, fine particles of ammonium sulfate or ammonium nitrate contained in the exhaust gas are deposited on a surface of the metal window foil. (For treating an exhaust gas containing nitrogen oxides or sulfur oxides, ammonia can be injected into the gas. The fine particles are formed when the injected ammonia combines with these oxides.) In this case, a problem occurs, such as fracture of the metal window foil due to a chemical action of the deposited substance.

FIGS. 8 to 14 show electron beam-irradiating reaction apparatuses including a means to solve the above-mentioned problem. In particular, the humidity of the cooling gas (or cooling air) blown against the metal window foil by the cooling gas nozzle assembly is set to a level equal to or higher than the critical humidity of fine powders deposited on the metal window foil. The critical humidity herein means the humidity at which a solid substance starts absorbing moisture in ambient air to start deliquescence. When a cooling gas having a humidity equal to or higher than the critical humidity is blown against a surface of the metal window foil on which fine powders of ammonium sulfate or ammonium nitrate are deposited, the fine powders absorb moisture in the cooling gas, dissolve, and are united with each other to thereby form particles having a large particle diameter, thus lowering the strength of adhesion thereof. Consequently, the particles are easily peeled of from the metal window foil by the cooling gas. Examples of critical humidities of ammonium sulfate and ammonium nitrate are shown in the table below.

| Temperature (° C.) | Critical Humidity of Ammonium Sulfate (%) | Critical Humidity of Ammonium Nitrate (%) |
| --- | --- | --- |
| 10 | 79.8 | 75.3 |
| 20 | 81.0 | 66.9 |
| 30 | 79.2 | 59.4 |
| 40 | 78.2 | 52.5 |
| 50 | 77.8 | 48.4 |

In the embodiments of the present invention, when a cooling gas is blown at a rate of 100 to 200 m/s, the pressure of the cooling gas in the cooling gas nozzle member becomes 10 to 20 kPa. When cooling gas is blown from the gas blow opening (i.e., gas slit), the cooling gas is subject to adiabatic expansion and a temperature thereof is lowered by 10° C. to several tens ° C. Consequently, moisture contained in the cooling gas condenses and forms fine drops of water. When the cooling gas containing drops of water impinges on the metal window foil, fine powders deposited on the foil are partially dissolved and change into solids having a large particle diameter, which are easily blown off by the cooling gas.

This effect can also be achieved by spraying pure water into the cooling gas, instead of utilizing the drops of water formed by adiabatic expansion.

With respect to the cooling gas, it is unnecessary to constantly blow the moisture-containing air against the metal window foil. It is possible to, for example, provide a valve in a nozzle for introducing a vapor into the cooling air, and open and close the valve so as to blow the moisture-containing air and air having a humidity less than the critical humidity (hereinafter, referred to as "dry air") in an alternate fashion. In this case, although fine powders are deposited on the metal window foil when dry air is blown, it is possible to prevent damage to the metal window foil by switching the dry air to the moisture-containing air before the amount of deposited fine powders increases to a level which adversely affects the metal window foil.

The moisture-containing air can be generated by providing a water spray nozzle in the electron beam reaction device in the vicinity of the cooling gas blow opening and entraining the water sprayed from the water spray nozzle in the cooling gas. It is preferred that the water spray nozzle be provided at a position as close as possible to the cooling gas blow opening, from the viewpoint of effectively entraining the sprayed water in the cooling gas. It is also preferred that the water spray nozzle be provided outside the region irradiated with the electron beam in the electron beam reaction device, from the viewpoint of preventing the water spray nozzle from being irradiated with the electron beam. Further, a two-fluid (water/air) nozzle for supplying air and water can be provided in the cooling gas nozzle member. A moisture content of the cooling air is adjusted by changing a ratio of a flow rate of air relative to a supply rate of water (a gas/liquid ratio). The gas/liquid ratio is preferably adjusted in a range of 50 to 1,000 $Nm^3/L$. The two-fluid nozzle can be made compact by forming the cooling gas nozzle member into a dual-tube structure.

The moisture-containing air can also be produced by providing a gas-liquid contact device for direct contact between air and drops of water in the cooling gas duct or cooling gas nozzle member. As the gas-liquid contact device, a water-circulation type cooling device for direct contact between air and circulated cooling water can be used. In the water-circulation type cooling device, a moisture content of the cooling air can be adjusted by adjusting a ratio L/G (L/$Nm^3$) of the flow rate L (L/h) of circulated cooling water relative to the flow rate G ($Nm^3$/h) of air. The L/G ratio is preferably adjusted in a range of 0.1 to 5 (L/$Nm^3$). Especially, when the L/G ratio (L/$Nm^3$) is set to 1 or more, drops of water can be contained in the cooling gas, so that the effect of preventing deposition of fine powders can be markedly achieved. The moisture-containing air and the dry air can also be switched by an ON/OFF operation of a circulating cooling water pump.

On the other hand, even when deposition of fine powders can be prevented, if the exhaust gas has a high concentration of sulfur oxides or nitrogen oxides and has a high corrosive effect, corrosion of the metal window foil is likely to occur due to the corrosive effect of the exhaust gas itself. As a countermeasure, it is preferable to conduct anti-corrosion treatment on a gas-contacted surface of the metal window foil. The anti-corrosion treatment can comprise coating the gas-contacted surface of the metal window foil made of titanium or an alloy thereof with a platinum type precious metal layer of, for example, palladium. Alternatively, corrosion of the metal window foil can be suppressed by adding ammonia to the cooling gas, to thereby create an alkaline atmosphere in the vicinity of the metal window foil and neutralize sulfur oxides or nitrogen oxides in the cooling gas.

FIGS. 8, 9, 11, 12 and 13 show electron beam exhaust gas treatment apparatuses having arrangements such as those mentioned above for suppression of corrosion of the metal window foil. FIG. 10 is an enlarged cross-sectional view of a water-circulation type cooling device used in the apparatus of FIG. 9. FIG. 14a shows a two-fluid nozzle and FIG. 14b shows a cooling gas nozzle member connected to the two-fluid nozzle.

Figure 10:
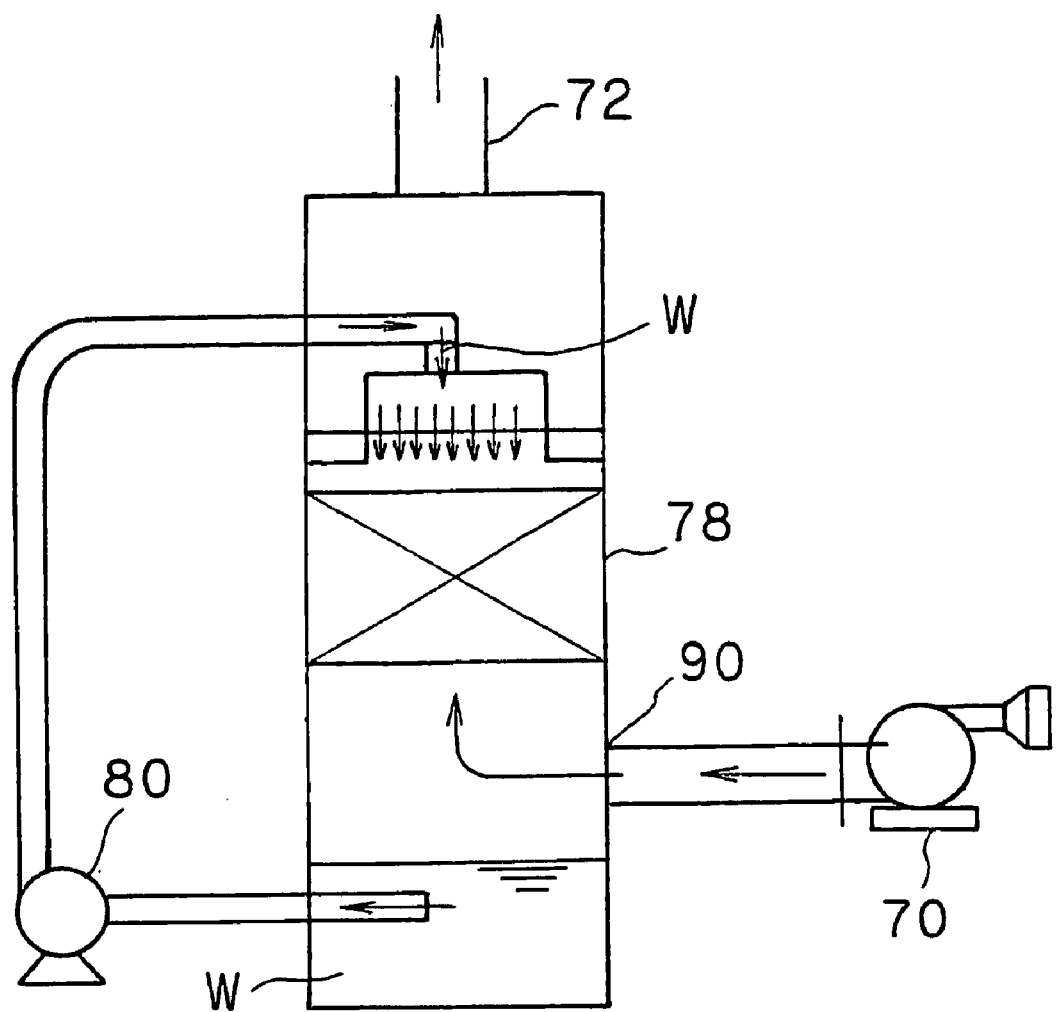
FIG. 10 is a cross-sectional view of a water-circulation type cooling device used in the electron beam-irradiating reaction apparatus of FIG. 9.
Figure 11:
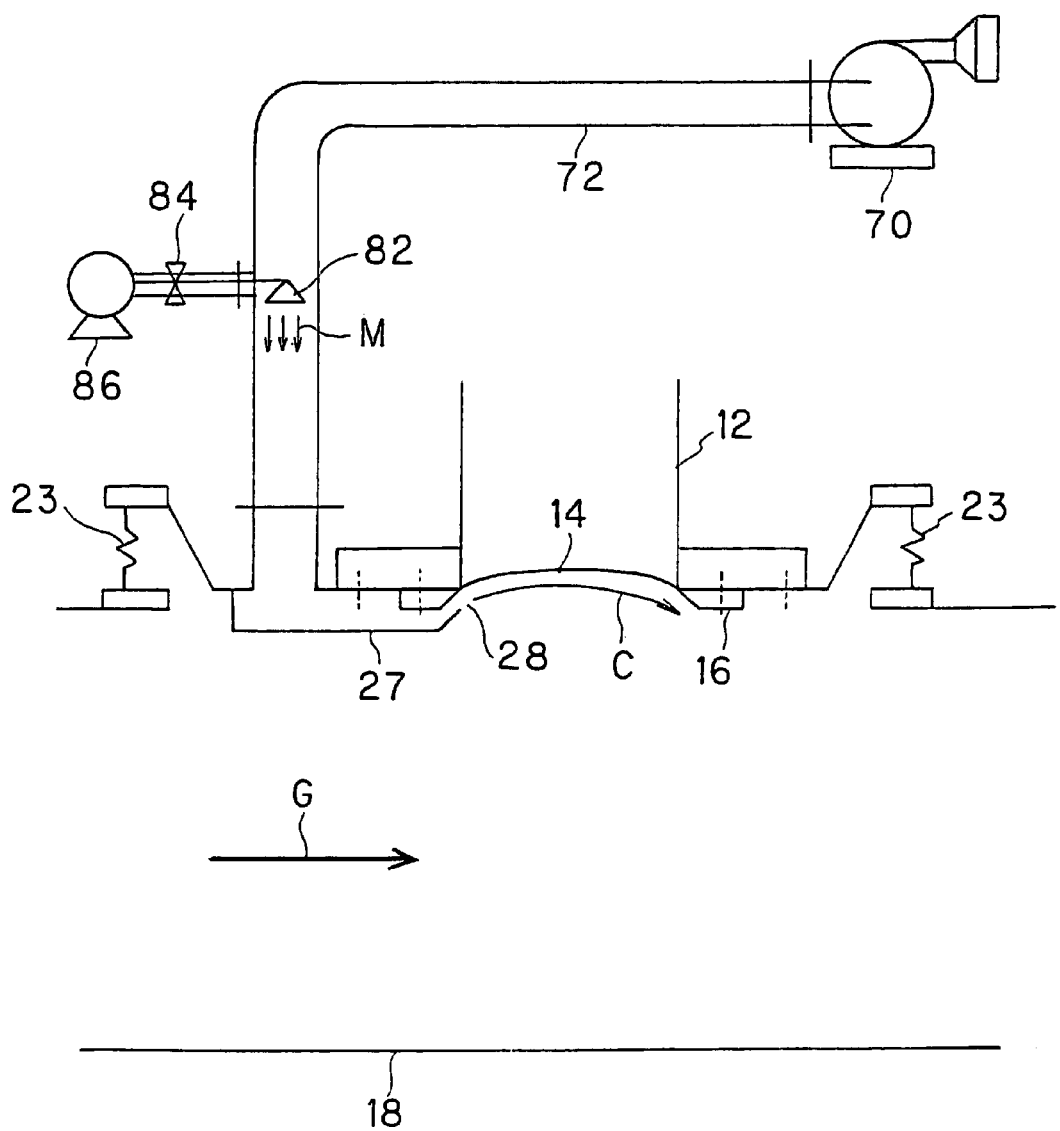
FIG. 11 is a cross-sectional view of a part of an electron beam-irradiating reaction apparatus according to a sixth embodiment of the present invention.

In these drawings, reference character C denotes a cooling gas; G an exhaust gas; M sprayed water (FIG. 11); S vapor; and W circulated water. Reference numeral 12 denotes the scanning tube of the electron accelerator; 14 the metal window foil; 16 the holding plate; 18 the electron beam reaction device (the exhaust gas duct); 23 the flexible cylindrical hermetic sealing member; 27 the cooling gas nozzle assembly; 28 a gas slit (a cooling gas blow opening); 70 a cooling gas blower; 72 a cooling gas duct; 74 a vapor injection opening; 76 a vapor valve; 78 a water-circulation type cooling device (FIG. 10); 80 a circulating cooling water pump (FIG. 10); 82 a water spray nozzle (FIG. 11); 84 a valve; and 86 a water spray pump.

Hereinbelow, experiments conducted with respect to these electron beam-irradiating reaction apparatuses are described.

Figure 8:
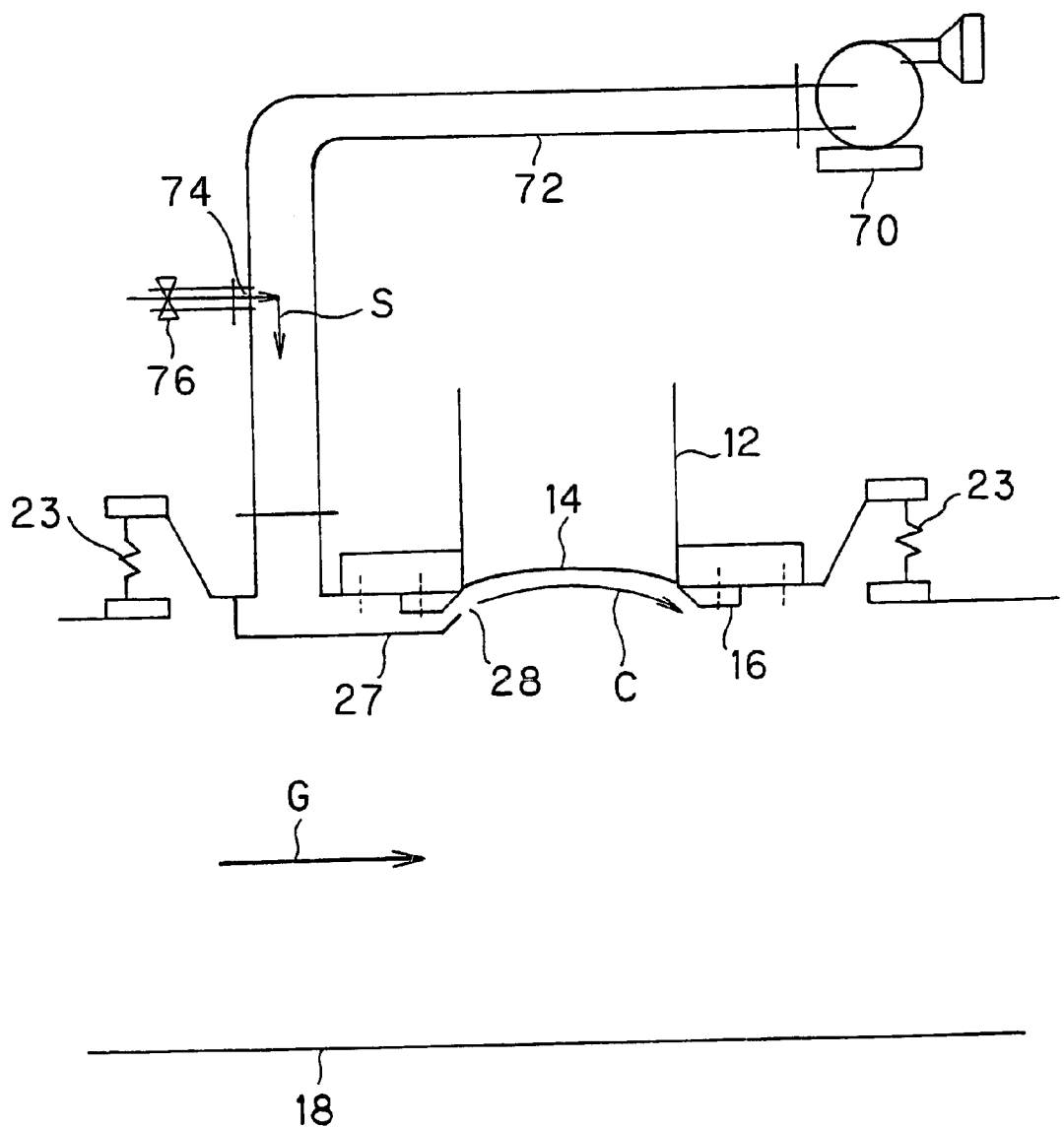
FIG. 8 is a cross-sectional view of a part of an electron beam-irradiating reaction apparatus according to a fourth embodiment of the present invention.

In the electron beam-irradiating reaction apparatus of FIG. 8, an electron beam which had been generated at an acceleration voltage of 500 kV with a beam current of 15 mA was irradiated from the scanning tube 12 of the electron accelerator through the metal window foil 14 made of titanium and having a thickness of 50 μm into 1,500 $Nm^3$/h of an exhaust gas in the electron beam reaction device 18. The exhaust gas had a temperature of 60° C. and contained 1,500 ppm of sulfur oxides. (These conditions are the same in the experiments described below with respect to the other electron beam-irradiating reaction apparatuses.) In order to cool the metal window foil 14, a cooling gas was blown at a rate of 400 $Nm^3$/h through the gas slit 28 of the cooling gas nozzle assembly 27. The temperature of the cooling gas was set to 60° C. The rate of injection of the vapor S from the vapor injection opening 74 formed in the cooling gas duct 72 was adjusted in a range of 10 to 100 liters/h, by changing the degree of opening of the vapor valve 76. Consequently, moisture-containing air (air having a humidity equal to or higher than the critical humidity) was generated and blown from the gas slit 28 against the metal window foil 14 at a rate of about 100 to 200 m/s. As a result, deposition of fine powders was nil or negligible. No damage to the metal window foil occurred 1,000 hours after commencement of operation, although when only dry air was blown against the metal window foil, the metal window foil fractured about 100 hours after commencement of operation.

Figure 9:
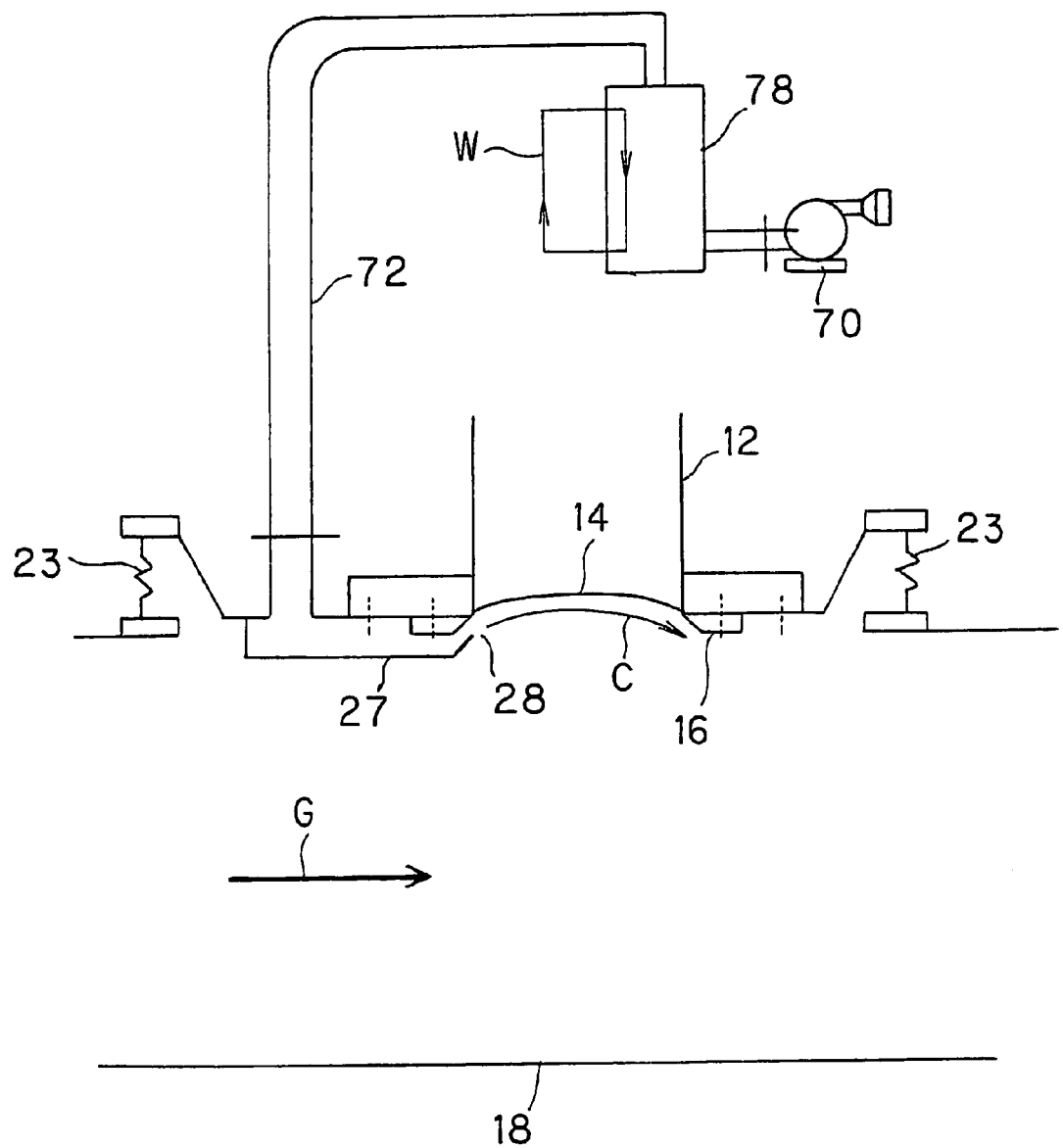
FIG. 9 is a cross-sectional view of a part of an electron beam-irradiating reaction apparatus according to a fifth embodiment of the present invention.

In the electron beam-irradiating reaction apparatus of FIG. 9, the water-circulation type cooling device 78 for bringing air into contact with the circulated cooling water W is provided in the cooling gas duct 72. Air having a temperature of 60° C. was supplied from an air flow inlet into the water-circulation type cooling device through the cooling gas blower 70, while the circulated cooling water W was supplied from the circulating cooling water pump 80 at a flow rate of 7 to 15 liters/h. Air was brought into contact with the circulated cooling water in the water-circulation type cooling device, to thereby form moisture-containing air, and the moisture-containing air was blown from the gas slit 28 against the metal window foil 14 at a rate of about 100 to 200 m/s. As a result, deposition of fine powders was nil or negligible. 1,000 Hours after commencement of operation, no damage to the metal window foil occurred.

In the electron beam-irradiating reaction apparatus of FIG. 11, the water spray nozzle 82 is provided in the cooling gas duct 72. Water was supplied from the water spray pump 86 to the water spray nozzle 82 and sprayed into the cooling gas duct 72. In this water spray device, the moisture content was adjusted by adjusting the amount of water sprayed into the cooling air in a range of 10 to 100 liters/h. Thus, a cooling gas containing drops of water was produced and blown from the gas slit 28 against the metal window foil 14 at a rate of about 100 to 200 m/s. As a result, deposition of fine powders was nil or negligible. 1,000 Hours after commencement of operation, no damage to the metal window foil occurred.

Figure 12:
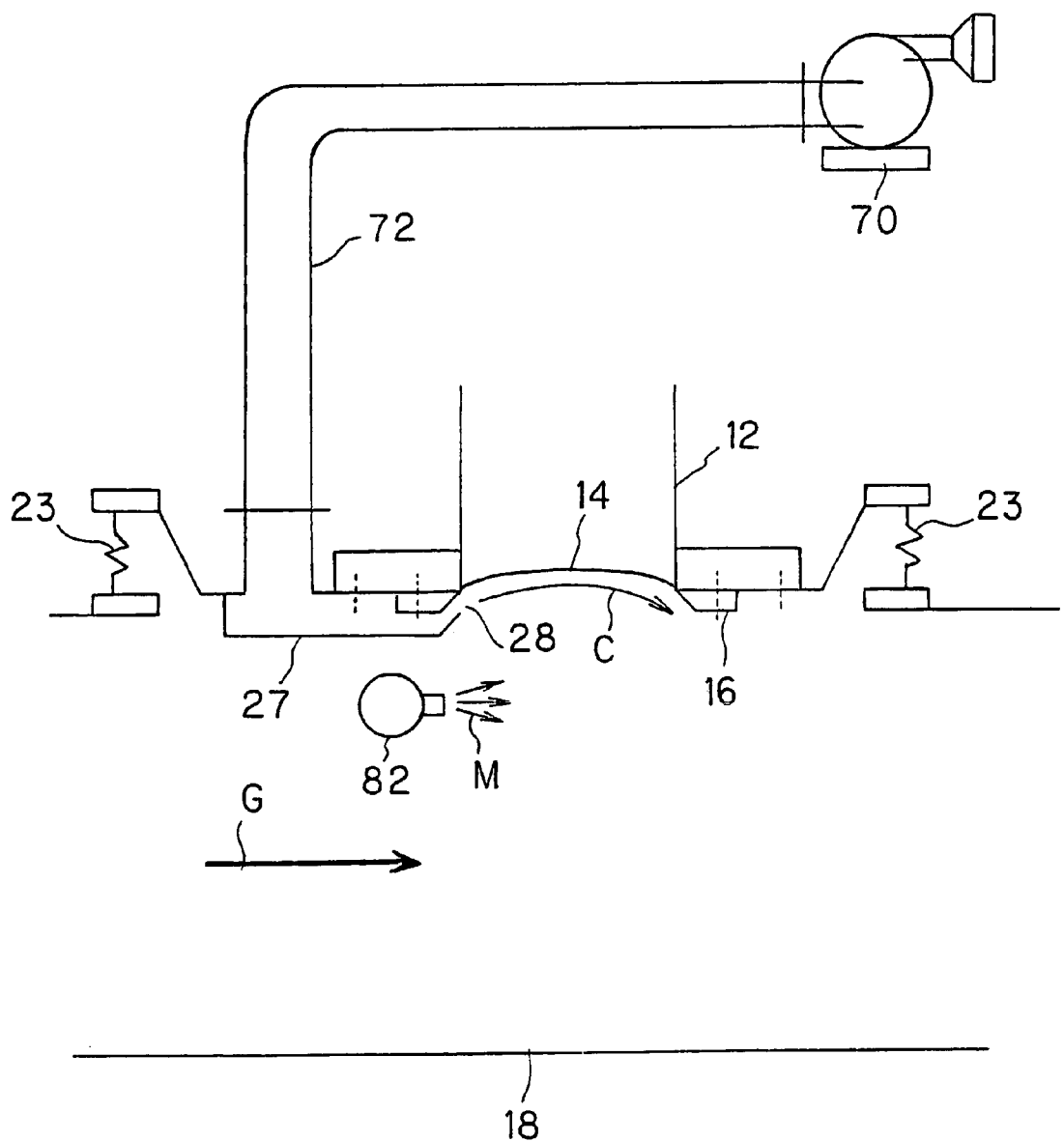
FIG. 12 is a cross-sectional view, in a direction of irradiation of an electron beam, of a part of an electron beam-irradiating reaction apparatus according to a seventh embodiment of the present invention.

In the electron beam-irradiating reaction apparatus of FIG. 12, the water spray nozzle 82 is provided in the vicinity of the gas slit 28. The sprayed water pressure was set to 0.3 MPa, the air pressure was set to 0.4 MPa, and the amount of sprayed water was set to 20 to 200 liters/h. The sprayed water was entrained in the cooling gas which was blown from the gas slit 28 against the metal window foil 14 at a rate of about 100 to 200 m/s. As a result, deposition of fine powders was nil or negligible. 1,000 Hours after commencement of operation, no damage to the metal window foil occurred.

Figure 13:
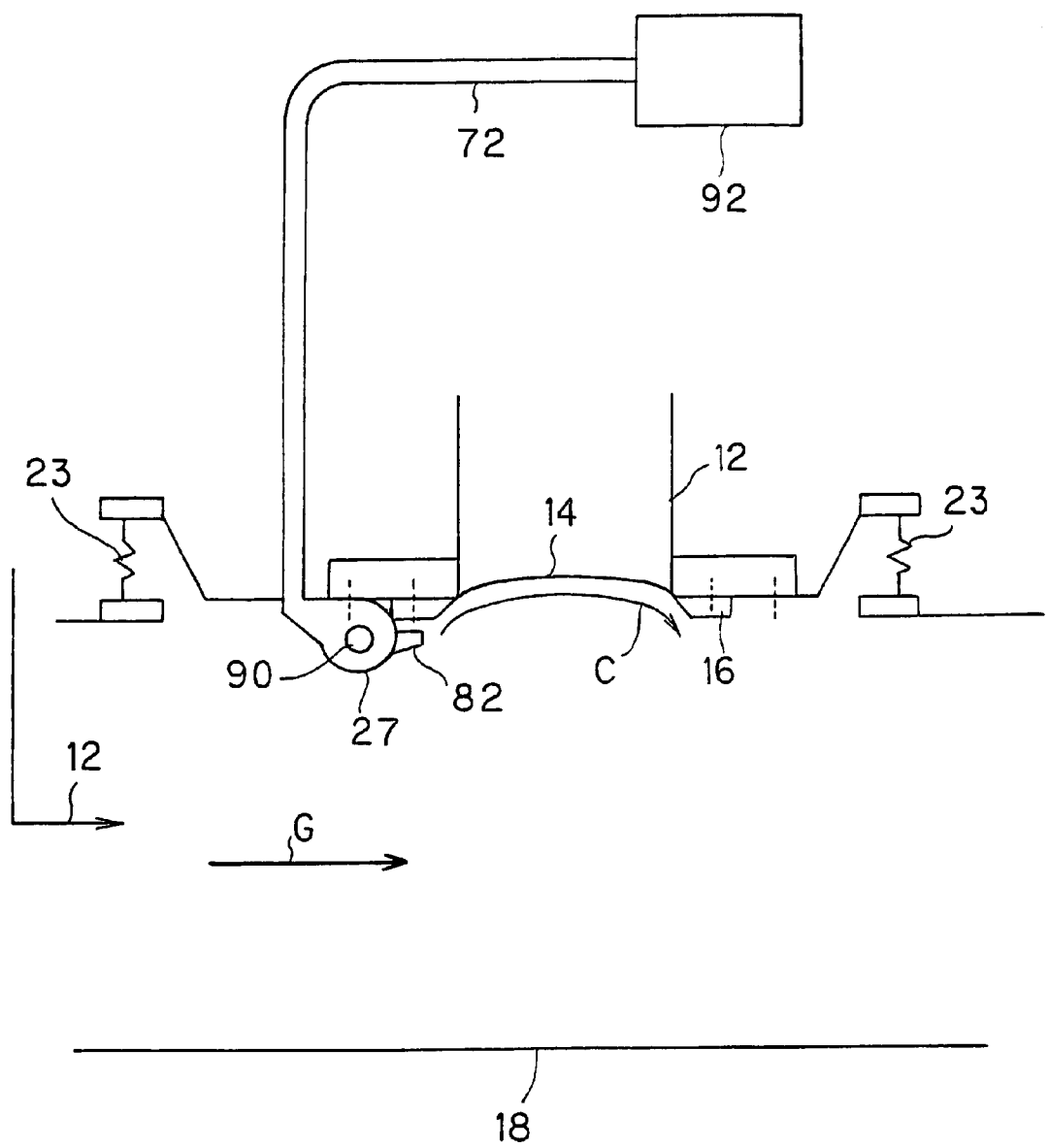
FIG. 13 is a cross-sectional view of a part of an electron beam-irradiating reaction apparatus according to an eighth embodiment of the present invention.

In the electron beam-irradiating reaction apparatus of FIG. 13, a cooling gas compressor 92 was used, instead of the cooling gas blower 70. Further, the cooling gas nozzle member had a dual-tube structure, and water was supplied from a water spray pump (not shown) to an inner water supply tube 90. The water was mixed into the cooling gas in a gas-liquid mixing chamber of the water spray nozzle 82 provided at a distal end of the cooling gas nozzle member. Thereafter, the cooling gas containing fine drops of water was blown from a distal end of the nozzle against the metal window foil. In the two-fluid nozzle 82, the sprayed water pressure was set to 0.3 MPa, the air pressure was set to 0.4 MPa and the amount of sprayed water was adjusted in a range of 20 to 200 liters/h, or 50 to 1000 $Nm^3/L$ in terms of a gas/liquid ratio. As a result, deposition of fine powders was nil or negligible. 1,000 Hours after commencement of operation, no damage to the metal window foil occurred.

FIG. 14(*a*) is a cross-sectional view of the two-fluid nozzle 82 in the apparatus of FIG. 13, and FIG. 14(*b*) is a cross-sectional view of the cooling gas nozzle. The cooling gas nozzle having a dual-tube structure and the two-fluid nozzle 82 are connected at threads 24. The water W and the cooling gas C respectively pass through an inner tube and an outer tube of the dual-tube structure, and are mixed in a gas-liquid mixing chamber 96 in the two-fluid nozzle 82 and blown from an injection opening of a distal end tip 98.

Basically, in the apparatuses of FIGS. 8 to 11, the humidity of the cooling gas is set to a level equal to or higher than the critical humidity. Actually, in many cases, the cooling gas is subject to adiabatic expansion upon injection from the nozzle assembly, to thereby form fine drops of water. In the same apparatuses, moisture may be initially supplied to the cooling gas in an amount sufficient for forming fine drops of water.

INDUSTRIAL APPLICABILITY

As has been described above, in the present invention, an electron beam reaction device, which contains an object to be irradiated with an electron beam, and an electron accelerator are connected by a flexible cylindrical hermetic sealing member. Thus, it is possible to prevent leakage of a cooling gas blown against the metal window foil and leakage of an exhaust gas to be treated, without applying excessive stress to a connecting portion between the electron beam reaction device and the electron accelerator.

It is also possible to prevent fine powders contained in a gas to be treated, such as an exhaust gas, from being deposited on the metal window foil, by blowing air having a high moisture content as a cooling gas against the metal window foil.

Therefore, according to the present invention, it has become possible to provide an electron beam-irradiating reaction apparatus which can be safely operated even when a secondary metal window foil is omitted and only a primary metal window foil is used, and which is economical in both production and operation as compared to an apparatus having the primary and secondary metal window foils.

What is claimed is:

1. An electron beam-irradiating reaction apparatus comprising:
    an electron beam irradiation device for generating an electron beam, said electron beam irradiation device having an electron beam release window for allowing emission of the electron beam;
    a metal window foil extending across said electron beam release window so as to maintain a vacuum within said electron beam irradiation device;
    an electron beam reaction device for containing a gas to be irradiated by the electron beam, said electron beam reaction device having an electron beam receiving window arranged so that the electron beam generated by said electron beam irradiation device is received by said electron beam reaction device via said electron beam receiving window, said electron beam irradiation device and said electron beam reaction device being independently supported and not rigidly connected to each other;
    a cooling gas nozzle assembly including a blow opening arranged to blow cooling gas against said metal window foil; and
    a flexible hermetic sealing member between said electron beam irradiation device and said electron beam reaction device, and arranged to prevent leakage of the cooling gas and the gas to be irradiated.

2. The electron beam-irradiating reaction apparatus of claim 1, wherein said sealing member has a cylindrical shape.

3. The electron beam-irradiating reaction apparatus of claim 1, wherein said electron beam release window is located at an end portion of said electron beam irradiation device, said sealing member being connected between said end portion and a peripheral edge portion of said electron beam receiving window of said electron beam reaction device.

4. The electron beam-irradiating reaction apparatus of claim 1, further comprising a moisture supply device for supplying moisture into the cooling gas blown by said cooling gas nozzle assembly such that a humidity of the cooling gas is equal to or higher than a critical humidity of fine powders in the cooling gas deposited on a surface of said metal window foil.

5. The electron beam-irradiating reaction apparatus of claim 1, further comprising a water supply device for supplying drops of water into the cooling gas blown by said cooling gas nozzle assembly.

6. The electron beam-irradiating reaction apparatus of claim 1, wherein said cooling gas nozzle assembly is arranged at an end of said electron beam irradiation device, said flexible hermetic sealing member being connected between an outer peripheral portion of said cooling gas nozzle assembly and a peripheral edge portion of said electron beam receiving window.

7. The electron beam-irradiating reaction apparatus of claim 6, further comprising a moisture supply device for supplying moisture into the cooling gas blown by said cooling gas nozzle assembly such that a humidity of the cooling gas is equal to or higher than a critical humidity of fine powders in the cooling gas deposited on a surface of said metal window foil.

8. The electron beam-irradiating reaction apparatus of claim 6, further comprising a water supply device for supplying drops of water into the cooling gas blown by said cooling gas nozzle assembly.

9. The electron beam-irradiating reaction apparatus of claim 6, wherein said electron beam receiving window has an area larger than a cross-sectional area of the electron beam to be generated by said electron beam irradiation device, said cooling gas nozzle assembly being annularly formed so as to surround the electron beam, and said cooling gas nozzle assembly being arranged at said electron beam receiving window.

10. The electron beam-irradiating reaction apparatus of claim 9, wherein said metal window foil comprises a first metal window foil, further comprising a second metal window foil at an end face of said cooling gas nozzle assembly adjacent to said electron beam reaction device so as to extend across a path of the electron beam, said cooling gas nozzle having a blow opening for blowing the cooling gas against said first metal window foil and against said second metal window foil, and having a discharge opening for discharging the blown cooling gas.

11. The electron beam-irradiating reaction apparatus of claim 9, wherein said metal window foil comprises a first metal window foil, said cooling gas nozzle assembly having:

- an end face adjacent to said electron beam reaction device and having a window in said end face;
- a second metal window extending across said window of said end face;
- a first blow opening and a second blow opening for blowing a cooling gas against said first metal window foil and said second metal window foil, respectively;
- a first receiving opening and a second receiving opening for receiving cooling gas from an exterior of said cooling gas nozzle assembly and supplying the cooling gas to said first blow opening and said second blow opening, respectively; and
- a first discharge opening and a second discharge opening for discharging the cooling gas blown from said first blow opening and said second blow opening, respectively, to the an exterior of said cooling gas nozzle assembly.

12. The electron beam-irradiating reaction apparatus of claim 9, further comprising a moisture supply device for supplying moisture into the cooling gas blown by said cooling gas nozzle assembly such that a humidity of the cooling gas is equal to or higher than a critical humidity of fine powders in the cooling gas deposited on a surface of said metal window foil.

13. The electron beam-irradiating reaction apparatus of claim 9, further comprising a water supply device for supplying drops of water into the cooling gas blown by said cooling gas nozzle assembly.

14. The electron beam-irradiating reaction apparatus of claim 9, further comprising a protective member for preventing backscattered electrons from impinging upon said sealing member.

15. The electron beam-irradiating reaction apparatus of claim 14, further comprising a moisture supply device for supplying moisture into the cooling gas blown by said cooling gas nozzle assembly such that a humidity of the cooling gas is equal to or higher than a critical humidity of fine powders in the cooling gas deposited on a surface of said metal window foil.

16. The electron beam-irradiating reaction apparatus of claim 14, further comprising a water supply device for supplying drops of water into the cooling gas blown by said cooling gas nozzle assembly.

17. The electron beam-irradiating reaction apparatus of claim 14, wherein said metal window foil is sealably fixed at a peripheral edge of said electron beam release window by a removable holding plate, said cooling gas nozzle assembly including a removable portion arranged adjacent to said holding plate so as to form a cooling gas blow opening therebetween.

18. The electron beam-irradiating reaction apparatus of claim 17, further comprising a moisture supply device for supplying moisture into the cooling gas blown by said cooling gas nozzle assembly such that a humidity of the cooling gas is equal to or higher than a critical humidity of fine powders in the cooling gas deposited on a surface of said metal window foil.

19. The electron beam-irradiating reaction apparatus of claim 17, further comprising a water supply device for supplying drops of water into the cooling gas blown by said cooling gas nozzle assembly.

* * * * *